United States Patent [19]
Lopez

[11] 3,784,136
[45] Jan. 8, 1974

[54] CHRISTMAS TREE STAND HOLDER

[76] Inventor: Erlindo C. Lopez, 9270 Hemlock, Cucamonga, Calif. 91730

[22] Filed: Aug. 18, 1972

[21] Appl. No.: 281,995

[52] U.S. Cl. .................................................. 248/44
[51] Int. Cl. ............................................ A47g 33/12
[58] Field of Search .......................... 248/44, 46, 48; 47/34, 38, 41.11, 41.13

[56] References Cited
UNITED STATES PATENTS

| | | | |
|---|---|---|---|
| 2,750,138 | 6/1956 | Morris | 248/44 |
| 558,433 | 4/1896 | Stoddard | 248/44 X |
| 3,411,740 | 11/1968 | Schulz | 248/48 |

FOREIGN PATENTS OR APPLICATIONS

| | | | |
|---|---|---|---|
| 469,954 | 12/1950 | Canada | 248/44 |
| 42,398 | 4/1917 | Sweden | 47/38 |

*Primary Examiner*—William H. Schultz
*Attorney*—Herbert E. Kidder

[57] ABSTRACT

A device for holding the wooden Christmas tree stand with the bottom end of the tree trunk submerged in water, so that the tree can take up water and retain its freshness. The device comprises a shallow, flat-bottomed basin of sufficient lateral dimension to receive the conventional wooden stand, and sufficient depth to hold water to cover the stand and the cut end of the trunk. A two-piece lid is provided, in which the two halves are hinged together near one edge, so that they can be swung apart to pass the tree trunk between them, said halves being brought together with the trunk in the center. A swinging latch on one of the halves fastenes to the other half to tie the two lid halves together. At its center, the lid has a circular opening to receive the tree trunk, and a series of slots radiating from the opening form flaps that bend upwardly to accommodate a trunk that is larger than the opening. Score lines provide lines of weakness, so that the flaps will bend up freely at their bases.

5 Claims, 4 Drawing Figures

PATENTED JAN 8 1973　　　　　　　　　　　　　　　3,784,136
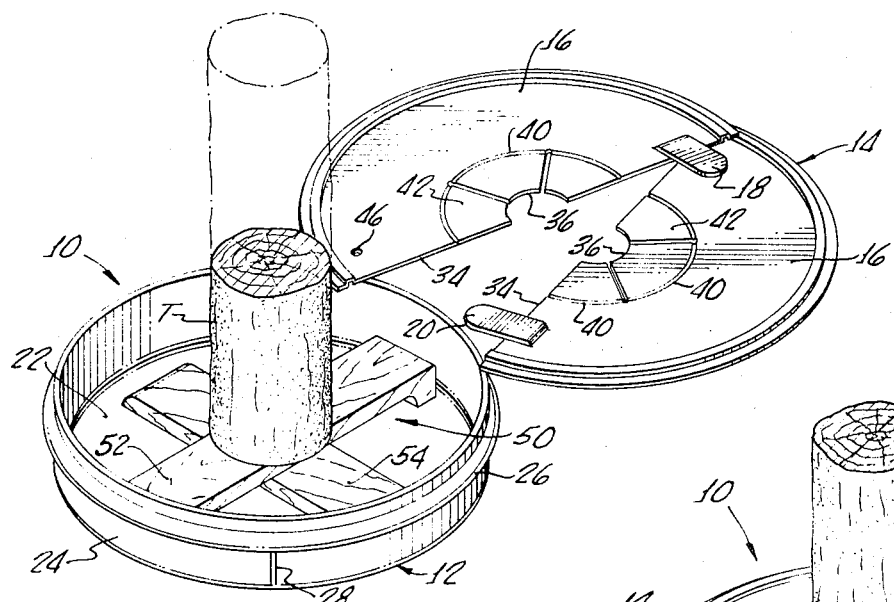
FIG. 1.
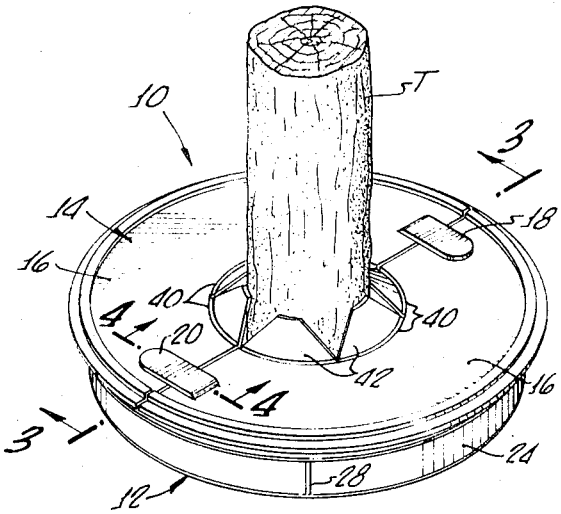
FIG. 2.
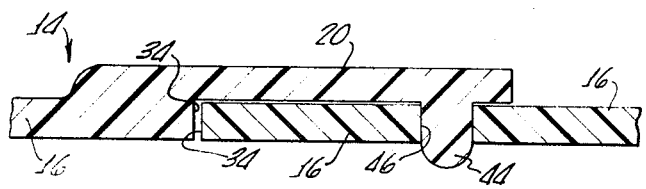
FIG. 4.
FIG. 3.
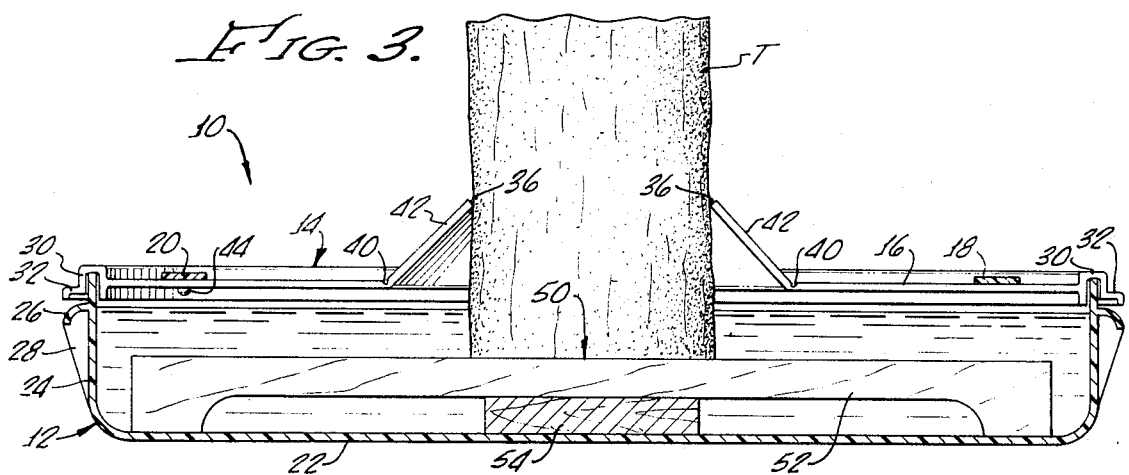

CHRISTMAS TREE STAND HOLDER

BACKGROUND OF THE INVENTION

The present invention pertains to holders for Christmas tree stands, and more particularly to a holder of the type wherein the cut end of the tree is submerged in water, so that it is able to take up water and stay fresh and moist for a long period of time.

During the weeks that precede the Christmas season, cut trees are set up in sales lots all over the country, and are sold by the millions with simple wooden cross stands nailed to the bottom end of the trunk. Most purchasers take the trees home with them, and let them stand around in the yard or any convenient space until the time comes to set up the tree inside the house and decorate it. The tree is then often set up in the living room or family room, using the same wooden cross stand that came with it. This is a convenient and easy way to keep the tree and set it up indoors, but it has one big disadvantage, and that is that the cut end of the trunk is constantly exposed to the air, and the tree quickly dries out and loses much of its appealing freshness and fragrance. The needles tend to fall off quickly, and the tree soon becomes a tinder-dry fire hazard.

Tree holders are available on the market that provide a sump of water into which the cut end of the trunk is immersed, and these are successful to a considerable extent in keeping the tree moist and fresh. However, such holders are relatively expensive and sometimes difficult to use. Often it is necessary to cut off some of the lowest branches on the tree in order to seat the tree trunk all the way down into the holder, and the loss of these bottom branches sometimes detracts considerably from the appearance of the tree. Other times, it becomes necessary to trim the trunk down somewhat in diameter, in order to make it fit the holder, or to provide a good surface for the prongs to bite into. Most of these holders hold only a small quantity of water, which is quickly taken up by the tree, and it is quite difficult and awkward to refill them, particularly when the tree is covered with ornaments. Frequently, refilling the reservoir results in spilling water onto the floor or carpet, which is messy and may cause damage. Another objection of prior water-filled holders of this type is that the surface of the water is open and exposed, so that pets sometimes drink from them, or crawling infants can get at the water. Since some people add various substances such as aspirin tablets, corn syrup, vitamin tablets, and even chlorine bleach, to the water, it is hazardous to leave such water where a pet or child might get into it.

SUMMARY OF THE INVENTION

The primary object of the present invention is to provide a new and improved holder for Christmas trees, wherein the conventional wooden cross stand that is usually sold with the tree is set down into a basin partially filled with water, so that the bottom end of the tree trunk is immersed in water and is able to take up water as needed, to keep the tree fresh and moist. The principal advantage of the invention is that it allows the wooden cross stand to be used to hold the tree upright, and it is not necessary to buy an expensive metal stand having the disadvantages described above.

Another object of the invention is to provide a Christmas tree stand holder of the class described, which holds a considerable volume of water, so that it is not necessary to refill the reservoir once the tree has been set up.

A further object of the invention is to provide a Christmas tree stand wherein the base of the tree trunk is immersed in water, and in which the water is completely covered by a lid, so that pets or children cannot get to it.

Still another object of the invention is to provide a tree-watering holder for the wooden cross stand, which is simple and inexpensive to manufacture, non-rusting, and attractive in appearance.

These and other objects and advantages of the invention will become apparent to those skilled in the art from the following detailed description of the preferred embodiment thereof, taken in conjunction with the accompanying drawing.

BRIEF DESCRIPTION OF THE DRAWING

FIG. 1 is a perspective view of a tree stand holder embodying the invention, showing the two halves of the lid spread apart to pass on opposite sides of the tree trunk;

FIG. 2 is another perspective view, showing the lid closed around the tree trunk and secured by its latch;

FIG. 3 is an enlarged sectional view, taken at 3—3 in FIG. 2; and

FIG. 4 is an enlarged fragmentary sectional view, taken at 4—4 in FIG. 2, showing one of the straps that serves both as a hinge and as a latch for the lid.

DESCRIPTION OF THE PREFERRED EMBODIMENT

In the drawings, the Christmas tree stand holder of the present invention is designated in its entirety by the reference numeral 10, and comprises a shallow, flat-bottomed basin 12, and a two-piece lid 14, the two identical halves 16 of which are hinged together near one edge by a hinge strap 18. Diametrically opposite from the hinge strap 18 is a latch strap 20, which serves to secure the two halves of the lid together in side-by-side relation, as shown in FIG. 2, when the lid has been placed around the tree trunk. The two straps 18, 20 are both molded integrally with their respective lid halves 16, as shown in FIG. 4. The basin 12 and lid halves 16 are preferably molded on polyethylene, although any other suitable material might be used.

The basin 12 is preferably circular in planform, with a flat bottom 22 and cylindrical side walls 24. The basin 12 may be made in two sizes to take all of the standard-size wooden cross stands, the two sizes being: (1) 19 inches in diameter and 3 inches deep, to take 12 inch and 18 inch stands, for trees ranging from 2 feet to 4 feet in height; and (2) 31 inches in diameter and 4 inches deep, to take 24 inch and 30 inch stands, for trees ranging from 5 feet to 8 feet in height. The bottom and side walls thickness of the basin might typically be about 0.150 inch for the 31 inch diameter basin, and 0.120 inch for the 19 inch diameter basin. These dimensions are not at all critical, and are only given by way of example. Projecting radially outward from the side wall 24 near the upper edge thereof is a circumferentially extending flange 26, which is curled downwardly to give stiffness to the resilient side wall. Four webs 28 spaced apart equidistantly around the perimeter of the basin, provide stiffness to the flange 26.

The lid 14 is made up of two semi-circular halves 16, which cooperate to form a relatively flat, circlar lid that is slightly larger in diameter than the basin. Around the outer edge of the two halves is a downwardly facing channel 30, which is positioned to receive the top edge of the basin side wall 24, as best shown in FIG. 3. The inside width of the channel 30 is just a few thousandths of an inch greater than the thickness of the basin wall 24, so that the latter is a snug fit within the channel. Projecting radially outward from the outer wall of the channel 30 at the bottom edge thereof is a stiffening flange 32, the purpose of which is to give extra stiffening and rigidity to the outer wall of the channel, making the channel relatively firm and unyielding, despite the resilient nature of the polyethylene material of which it is made. The inner wall of the channel is stiffened by the flat web of the lid, which joins the channel inner wall about midway between its top and bottom edges.

At the midpoint of each of the diametrical edges 34 is a semi-circular cur-out 36, the radius of which is typically 1 inch for the 19 inch diameter holder, and 1½ inches for the 31 inch diameter holder. When the two halves 16 are brought together, as in FIG. 2, the two cut-outs 36 register with one another to form circular openings of 2 inch or 3 inch diameter, depending upon the size of the holder. Extending radially outward from the cut-oute 36 and spaced apart 60° from one another, are narrow slots 38, which are about 1½ inches to 2 inches in length. Connecting the outer ends of the slots 38 are arcuate lines of weakness 40, which are preferably formed by molding shallow grooves in the top surface of the lid members 16. The grooves 40 and slots 38 form three tapered flaps 42, which are bent upwardly along the grooves 40, as shown in FIGS. 2 and 3, when a tree trunk T of larger diameter than the opening 36 is placed in the holder.

The hinge strap 18 and latch strap 20 are identical in construction, and their functions are interchangeable. That is, either strap may serve as the hinge strap, and the other as the latch strap. Each of the straps is molded integrally with its respective lid half 16, and projects up above the lid half to which it is attached, as shown in FIG. 4, so that the free end of the strap overlies the adjoining lid half. Each strap is a flat strip of plastic, typically about 2 inches long, three-fourths inch wide and about 0.125 inch thick, having a round-ended protuberance 44 projecting downwardly from the underside near the free end of the strap. The protuberance 44 is adapted to be inserted down into a hole 46 formed in the other lid half 16, on the opposite side of edge 34, and is a tight fit therein. When the protuberances 44 are thus inserted into the holes 46, the strap 18 (or 20) is effectively "buttoned" to the lid 14 and bridges the abutting diametrical edges 34, thereby attaching the two halves 16, 16 together. When the latch strap 20 is released by pulling the free end of the strap away from the lid, the two halves 16 can be swung apart about the protuberance 44 of hinge strap 18, as shown in FIG. 1, to pass around the trunk T on both sides thereof.

The wooden cross stand 50, which is nailed to the bottom end of the trunk T, comprises upper and lower members 52, 54 respectively, which are disposed at right angles to one another. The two members 52, 54 are commonly formed by band-sawing a length of 2 × 4 lumber, so that the bottom member is cut out of the underside of the top member, and is then turned 90°. The longer top member is cut to a 12 inches length for trees that are 2 feet to 3 feet in height; 18 inches for trees 3 feet to 4 feet high; 24 inches for trees 5 feet to 6 feet high; and 30 inches for trees 7 feet to 8 feet high. Thus, both the 12 inch and 18 inch stands can be set in the 19 inch diameter basin, while both the 24 inch and 30 inch stands can be set in the 31 inch diameter basin. The trunk diameters of plantation-grown trees range from three-fourths inch for trees 2 feet to 3 feet high, up to 6½ inches for trees 9 feet high.

The mode of operation is as follows: The basin 12 of appropriate size is placed flat on the floor or ground, where the tree is to stand, and the tree with its wooden cross stand 50 nailed to the bottom end of the trunk is then placed in the basin, with the stand resting on the bottom 22. The basin is filled about three-quarters full with water, which brings the level of the water well above the cut end of the trunk T. The two halves 16 of the lid are unlatched and swung open, as in FIG. 1, to pass around the tree trunk. The lid 14 is centered with respect to the tree trunk, and flaps 42 are bent up, as necessary, to accommodate the diameter of the trunk. The channels 30 are then pushed down over the top edge of the basin side wall 24, and latch strap 20 is snapped into its respective hole 46. The tree is now erected and supplied with an ample amount of water, the surface of which is covered by the lid 14, so that no pet or child can get at the water.

While I have shown and described in considerable detail what I believe to be the preferred form of my invention, it will be understood that the invention is not limited to such details, but may take various other forms within the scope of the following claims.

I claim:

1. A holder for keeping a Christmas tree fresh and moist for an extended period of time, said holder being used with a conventional wooden cross stand fixed to the bottom end of the tree trunk, and the holder comprising, in combination:

a shallow, flat-bottomed basin of dimensions to receive the wooden cross stand of the tree therein, said basin having upstanding side walls, and being adapted to be partially filled with water, so that the wooden cross stand and the bottom end of the tree trunk are submerged in water;

a lid adapted to cover said basin, said lid having an opening in the center thereof through which the trunk of the tree passes, and the lid being divided so that it can be passed on both sides of the trunk in order to center the lid with respect to the trunk, and to seat said trunk in said opening;

said lid having resilient means around the perimeter of said opening which is expandable to allow a tree trunk of larger diameter than the opening to be received therein; and means for joining together the divided parts of said lid after the lid has been put around the tree trunk, so as to secure the lid in place and prevent the divided parts from separating;

said wooden cross stand providing the sole support for the tree independent of the holder, and said holder providing a basin to serve as a receptacle for said stand and the water in which it is immersed.

2. A Christmas tree holder as in claim 1, wherein said basin and said lid are circular in planform; said lid comprising two semi-circular halves which are placed on opposite sides of the tree trunk, each of said lid halves having a diametrical edge, and said diametrical edges abutting against one another when the lid halves are placed around said tree trunk; and each of said lid halves having a strap at one side along the diametrical edge, the free end of said strap overlying the other lid half and having a protuberance on its underside that is inserted into a hole in said other lid half, one of said straps serving as hinge means pivotally connecting said lid halves together, and the other strap serving as latch means.

3. A Christmas tree holder as in claim 1, wherein at least said lid is made of resilient plastic, and said resilient means comprises radial slits in the lid extending outwardly from said opening to form tabs which bend upwardly when a tree trunk of diameter larger than said opening is used with the holder, said lid having lines of weakness extending between the outer ends of adjacent radial slits, said lines of weakness providing a hinge-like action so that the tabs bend upwardly along said lines.

4. A Christmas tree holder as in claim 1, wherein said basin and said lid are molded of resilient plastic.

5. A Christmas tree holder as in claim 1, wherein said basin and said lid are molded of polyethylene.

* * * * *